July 15, 1952     R. W. WILSON     2,603,383
PELLET DISPENSING DEVICE
Filed Nov. 6, 1946     2 SHEETS—SHEET 1
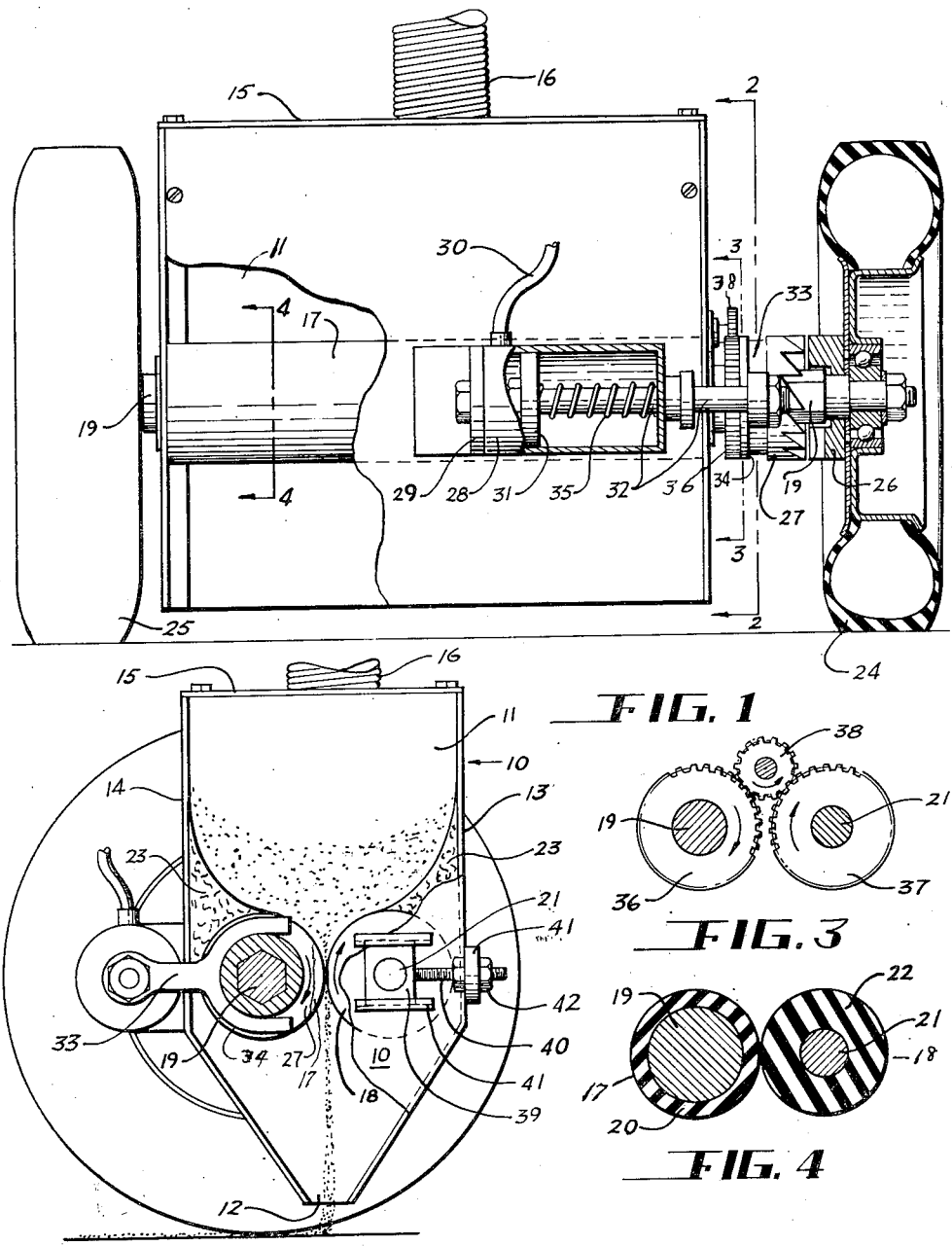
INVENTOR.
RUFUS W. WILSON
BY
ATTORNEY July 15, 1952  R. W. WILSON  2,603,383
PELLET DISPENSING DEVICE
Filed Nov. 6, 1946  2 SHEETS—SHEET 2
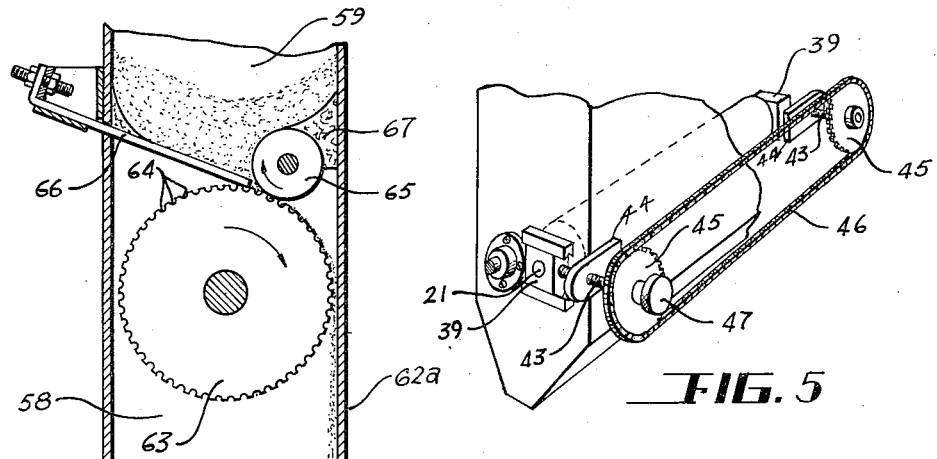
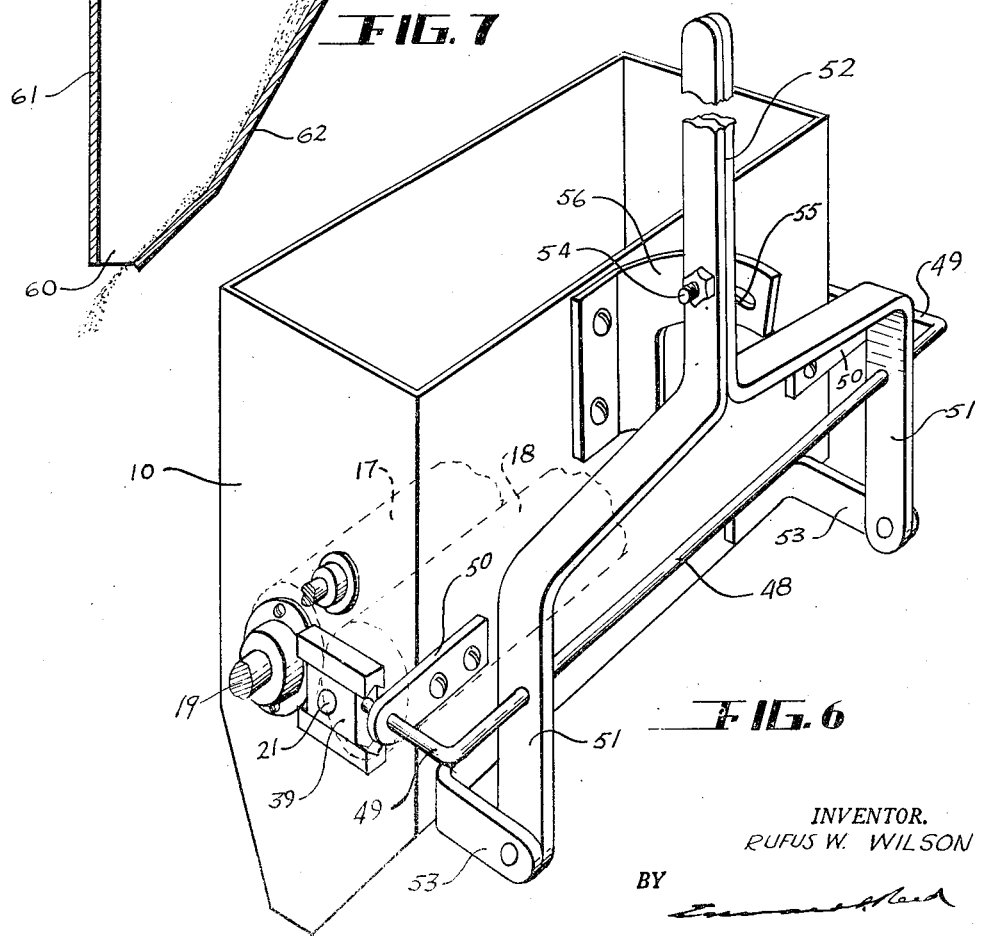
INVENTOR.
RUFUS W. WILSON
BY
ATTORNEY

UNITED STATES PATENT OFFICE 2,603,383

PELLET DISPENSING DEVICE

Rufus W. Wilson, Huntingdon, Pa., assignor to Prismo Products, Inc., Dayton, Ohio, a corporation of New York Application November 6, 1946, Serial No. 708,070

2 Claims. (Cl. 222—17.7)

This invention relates to a dispensing device for distributing small pellets over a surface to which they are to be applied, and is designed primarily for applying autocollimating elements, such as small transparent spheres, to a narrow layer of a wet paint-like binder which has been applied to the surface of a road to form a traffic stripe, and to thus impart reflectivity to the stripe.

One object of the invention is to provide a dispensing device which may be moved over a layer of adhesive or binder and will deliver pellets thereto in an exact predetermined quantity and will distribute the pellets uniformly over the surface of the binder.

A further object of the invention is to provide such a device which accurately controls the delivery and distribution of the pellets without danger of breaking or otherwise injuring the pellets.

A further object of the invention is to provide such a device which can be easily adjusted to accurately predetermine the quantity of pellets dispensed during a given movement of the dispenser.

A further object of the invention is to provide such a device which is simple in construction and operation and can be produced at a low cost.

Further objects of the invention may appear as the apparatus is described in detail.

In the accompanying drawings Fig. 1 is a rear elevation, partly broken away, of an apparatus embodying the invention; Fig. 2 is a transverse section taken on the line 2—2 of Fig. 1 and partly broken away; Fig. 3 is a section taken on the line 3—3 of Fig. 1; Fig. 4 is a section taken on the line 4—4 of Fig. 1; Fig. 5 is a perspective view of a portion of the device showing a modified form of adjusting mechanism; Fig. 6 is a similar view showing another form of adjusting mechanism; and Fig. 7 is a section taken through a modified form of the device and showing a different arrangement of rollers.

In these drawings I have illustrated one embodiment of my invention together with certain modifications thereof, and have shown the same as designed to be connected with and propelled by a striping machine of the general type shown in the Rodli and Wilson patent, No. 2,278,948 of April 7, 1942, but it is to be understood that the device as a whole, as well as the several parts thereof, may take various forms and that the device may be supported and propelled in any suitable manner, without departing from the spirit of the invention.

In the embodiment here illustrated the device comprises an upright structure or a housing 10 having within the upper portion thereof a receptacle 11 adapted to receive a quantity of small pellets, such as minute glass spheres. The lower portion of the housing is provided with an outlet 12 here shown as a continuous opening extending transversely to the line of movement of the device and formed between the lower edges of the downwardly converging lower portions of the front and rear walls, 13 and 14, of the housing. Pellets may be introduced into the receptacle by removing the top closure 15 but when the device is connected with a striping machine, as in the above mentioned patent, it is preferable to connect with the closure a flexible conduit 16 adapted to be connected with a relatively large reservoir of pellets on the striping machine.

Mounted within the housing between the receptacle and the outlet are two members which extend transversely to the line of movement of the housing to control the flow of the pellets from the receptacle to the outlet. At least one of these members is provided with a yieldable surface close to or in contact with the other member and is rotatable to cause the pellets to move between the two members in predetermined quantities. Preferably both of these members are rotatable and in the present instance both are in the nature of rollers, 17 and 18, and both are provided with yieldable surfaces. The roller 17, which in the present arrangement is the rear roller, comprises a shaft 19 which is rotatably supported in the end walls of the housing and which is provided with an outer layer or covering 20 of a suitable yieldable material, such as soft rubber. The roller 18 also comprises a shaft 21, rotatably supported in the end walls of the housing and having a relatively thick covering or body 22 of yieldable material, such as soft rubber, but for a purpose which will hereinafter appear, it may be desirable to provide this roller with a surface having relatively little, if any, yieldability. The two rollers are parallel one with the other and are so arranged that the opposed longitudinal surfaces thereof are in such close relation one to the other that pellets cannot pass between the same when the rollers are stationary. When, as in the present instance, the pellets are of very small size the surfaces of the two rollers are preferably in light contact one with the other. In the arrangement shown the axes of the rollers are in a common horizontal plane and the pellets in the receptacle are supported in part on the upper portions of the rollers, sealing means being provided to prevent the passage of pellets between the outer sides of the rollers and the walls of the housing. The sealing means are shown at 23 as felt pads extending for the full length of the respective rollers and having the upper inner surfaces thereon inclined to direct the pellets to the contacting portions of the rollers; thus, when the rollers are stationary, no pellets can pass between the same to the outlet but when the roller 17 is rotated, in a clock-wise direction in Fig. 2, pellets will be pressed into the yieldable surface thereof and will move between the same and the roller 18 and will be discharged from the rollers to the outlet.

Roller 17 may be driven in any suitable manner. In the present apparatus the shaft 19 of that roller extends beyond the respective ends of the housing and carries wheels, 24 and 25, which movably support the housing. The wheels are rotatably supported on the shaft and means are provided for releasably connecting one of the wheels, in the present instance the wheel 24, with the shaft. Preferably the connecting means is in the nature of a clutch and as here shown comprises a jaw clutch member 26 rigidly secured to the wheel 24 and a second jaw clutch member 27 connected with the shaft 19 for rotation therewith and slideable thereon into an out of clutching engagement with the clutch member 26. The clutch member 27 is here shown as mounted on a non-circular end portion of the shaft. The clutch member 27 may be actuated in any suitable manner and when the device is connected with the striping machine I prefer to provide fluid operated means for actuating the clutch. In the present arrangement a cylinder 28 is rigidly secured to the housing, as by a bracket 29, and is provided adjacent its inner end with a flexible conduit 30 by means of which it may be connected with a source of air under pressure, such as an air compressor on the striping machine. A piston 31 in the cylinder 28 is connected by a piston rod 32 with a yoke shaped member 33 the arms of which extend into a circumferential groove 34 in the hub portion of the clutch 27. A spring 35 confined between the piston 31 and the outer end of the cylinder 28 moves the clutch member 27 to its retracted or inoperative position and the admission of air to the cylinder actuates the piston to move the clutch member 27 into engagement with the clutch member 26 to drivingly connect the wheel 24 with the shaft of the roller 17. The supply of air to the cylinder may be controlled by the usual valve on the striping machine.

The roller 18 may be driven by its contact with the roller 17 but preferably means are provided for positively rotating the same. It may be rotated in either direction about its axis but when the pellets are of different sizes the larger and heavier pellets have a tendency to sink to the bottom of the receptacle, and to prevent the undue accumulation of large pellets at the rollers and to minimize the tendency of the pellets to adhere one to the other or to cake; it is preferable that the roller 18 be rotated about its axis in the same direction as the roller 17 is rotated so that the adjacent or lightly contacting portions of the rollers move in opposite directions, and that the surface of the roller 18 should have materially less yieldability than the surface of roller 17. This may be accomplished by mounting on the shafts 19 and 21 gears 36 and 37 which are connected one to the other by an idler pinion 38. When the rollers are stationary the pellets are supported in the receptacle 11 on the upper convergent surfaces of the rollers and when the rollers are rotated in the same direction about their respective axes the upward movement of the relatively firm supporting surface of the roller 18 tends to rotate the pellets, or glass spheres, which are in contact therewith and the rotation of those spheres is transmitted, in a lesser degree, to the adjacent pellets. Due to its relatively soft yieldable character the supporting surface of the roller 17 has a high co-efficient of friction and the downward movement of that portion of the surface which is in contact with the pellets rotates those pellets and this rotation is transmitted to adjacent pellets. Thus relative rotation of the rollers tends to agitate the pellets and disperse the same so that they are at all times free flowing. The pellets in contact with the supporting surface of roller 17 are moved downwardly thereby into the bite of the rollers and as each pellet engages the firm surface of the roller 18 it is pressed into the yieldable surface of the roller 17 and the area of frictional contact of the pellet with that surface is materially increased so that the pellet moves with the roller but has little rotation with relation thereto and thus has a substantially pin-point sliding contact with the correspondingly narrow portion of the firm surface of roller 18 and when the sphere has been carried beyond the tangent line the pellet is released from the roller 17 and dropped from the rollers.

Thus it will be apparent that as the dispenser is propelled over the ground with the outlet above a strip of wet binder the rollers will be positively driven to cause pellets to be moved between the rollers and discharged through the outlet onto the strip of binder. The pellets are moved between the rollers in uniform quantities for the full length of the latter, and the rollers and the outlet 12 being of a length approximately the same as the width of the strip the pellets will be distributed uniformly over the full width of the strip and there will be little or no wastage of the pellets.

The roller 18 is adjustable toward and from the roller 17 to control the quantity of pellets that can pass between the rollers. The pellets used for road striping are usually glass spheres of a diameter less than $\frac{1}{32}$ of an inch, and are often much smaller than that, and in order to accurately control the flow of these small spheres between the rollers the relative positions of the rollers must be very accurately determined and the rollers must be maintained parallel to secure uniform feeding throughout the length of the rollers.

Preferably the shaft 21 of the roller 18 is mounted in bearings which are adjustable transversely to the axis of the shaft, one of said bearings being shown at 39 in Fig. 2. Each bearing is connected with a screw 40 which extends through a bracket 41 rigidly secured to the housing 10 and is provided on opposite sides of the bracket with nuts 42 whereby the screw may be moved lengthwise to adjust the bearing and locked in its adjusted position. To insure that both end portions of the roller are moved exactly the same distance it is desirable that means should be provided for simultaneously actuating the adjusting means for both ends of the roller. As shown in Fig. 5, screws 43 are rotatably connected with the respective bearings 39 and are screw threaded in brackets 44. Rigidly secured to the outer end portions of the screws are sprocket wheels 45 connected one with the other by a sprocket chain 46, so that they will rotate in unison. One of the screws may be provided with a knob 47 or the like by which both screws may be simultaneously actuated to the same extent.

In Fig. 6 there is shown a lever operated mechanism for adjusting the roller 18. As there shown a rigid member, such as a rod 48, is provided with transverse end portions 49 which are slideably mounted in brackets 50 and are connected at their inner ends with the respective bearings 39. The rod 48 extends through the arms 51 of a forked lever 52, the lower ends of the arms being pivotally mounted on brackets 53 carried by the housing. The upper portion of the lever constitutes a handle by which the actuating member 48 may be moved transversely to adjust the roller. The lever may be secured in adjusted position in any suitable manner as by a bolt 54 extending through the lever and through a slot 55 in a bracket 56 also secured to the housing.

There is shown in Fig. 7 a modified form of housing and a different arrangement of the rollers. The housing 58 has in its upper portion a receptacle 59 for pellets, similar to that above described, and is provided at its lower end with an outlet 60 which is formed between the vertical rear wall 61 and the downwardly and rearwardly inclined lower portion 62 of the front wall 62a. A relatively large roller 63 is mounted in the housing and may be driven in any suitable manner, such as that above described. This roller may be either hard or yieldable and it is provided with a circumferential series of shallow flutes 64. A second relatively small roller 65 is mounted in the housing above roller 63 and between the vertical plane of the axis of roller 63 and the front wall 62a of the housing, this roller being provided with a yieldable surface as by a covering of suitable material, such as soft rubber. A sealing element 67 is secured to the front wall in engagement with the roller 65 to prevent the passage of pellets between the roller and the housing. Adjustably mounted in the rear wall of the housing is a plate or gate 66 which extends above the roller 63 and has its inner end spaced from the small roller 65 to form a passage through which pellets may be delivered to the flutes in the large roller. The pellets are then carried between the two rollers and discharged from the lower roller adjacent the front wall 62 and move downwardly over the inclined portion of that wall to the outlet.

While I have shown and described one embodiment of my invention, together with certain modifications thereof, I wish it to be understood that I do not desire to be limited to the details thereof as various modifications may occur to a person skilled in the art.

Having now fully described my invention, what I claim as new and desire to secure by Letters Patent, is:

1. In a device for dispensing pellets, a receptacle for said pellets, means for supporting said pellets in said receptacle, including two rollers movable about parallel axes and having adjacent portions of their cylindrical surfaces in such close relation one to the other that the pellets cannot pass between the same when both rollers are stationary, the cylindrical surface of one of said rollers being yieldable and the cylindrical surface of the other of said rollers being relatively firm, means for rotating said rollers about their respective axes in the same direction to move said adjacent portions thereof in opposite directions such that said adjacent portion of the roller having said yieldable surface moves downwardly and said adjacent portion of said roller having said firm surface moves upwardly, whereby pellets will be pressed into the yieldable surface of said one of said rollers and moved thereby between said rollers over the adjacent firm surface of the other of said rollers.

2. In a device for dispensing pellets, a receptacle for said pellets, means for supporting said pellets in said receptacle, including two rollers movable about parallel axes and having adjacent portions of their cylindrical surfaces in such close relation one to the other that the pellets cannot pass between the same when both rollers are stationary, the cylindrical surface of one of said rollers being yieldable and the cylindrical surface of the other of said rollers being relatively firm, and means for actuating said rollers to move the pellet supporting surface of the first mentioned roller downwardly, to move the pellet supporting surface of the last mentioned roller upwardly, and to press said pellets into said yieldable surface, whereby they are carried between said rollers and discharged therefrom.

RUFUS W. WILSON.

REFERENCES CITED

The following references are of record in the file of this patent:

UNITED STATES PATENTS

| Number | Name | Date |
|---|---|---|
| 293,968 | Keller | Feb. 19, 1884 |
| 1,427,341 | Ziegler | Aug. 29, 1922 |
| 1,628,546 | Koch | May 10, 1927 |
| 1,777,661 | Dellenbarger | Oct. 7, 1930 |
| 1,894,058 | Rice | Jan. 10, 1933 |
| 2,327,679 | Swenson | Aug. 24, 1943 |
| 2,369,983 | Rodli et al. | Feb. 20, 1945 |

FOREIGN PATENTS

| Number | Country | Date |
|---|---|---|
| 109,640 | Australia | Jan. 19, 1940 |